United States Patent [19]
Yoshida

[11] Patent Number: 5,806,834
[45] Date of Patent: Sep. 15, 1998

[54] ULTRAVIOLET-ASBORBING POLYMER FILM

[75] Inventor: Toru Yoshida, Kanagawa, Japan

[73] Assignee: Fuji Photo Film Co., Ltd., Kanagawa, Japan

[21] Appl. No.: 611,574

[22] Filed: Mar. 6, 1996

[30] Foreign Application Priority Data

Mar. 6, 1995 [JP] Japan .................................. 7-072379

[51] Int. Cl.$^6$ ........................................................ F21V 9/04
[52] U.S. Cl. ..................................................... 252/589
[58] Field of Search ................................ 252/582, 589, 252/588

[56] References Cited

U.S. PATENT DOCUMENTS

| 4,045,229 | 8/1977 | Weber et al. | 252/589 |
| 4,307,184 | 12/1981 | Beretta et al. | 430/512 |
| 4,576,908 | 3/1986 | Vallarino | 430/512 |
| 4,946,768 | 8/1990 | Vallarino | 430/512 |
| 5,385,815 | 1/1995 | Schofield et al. | 430/512 |

*Primary Examiner*—Philip Tucker
*Attorney, Agent, or Firm*—Birch, Stewart, Kolasch & Birch, LLP

[57] ABSTRACT

An ultraviolet-absorbing polymer film consists of a polymer and ultraviolet absorbers contained therein. The ultraviolet absorbers are composed of a compound having the formula (I):

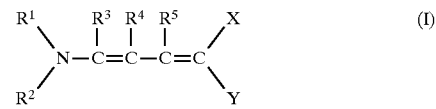

wherein each of $R^1$ and $R^2$ represents hydrogen, alkyl of 1 to 10 carbon atoms which may be substituted with phenyl, each of $R^3$, $R^4$ and $R^5$ represents hydrogen, phenyl or alkyl of 1 to 5 carbon atoms, and each of X and Y represents cyano, —COOR, —CONHR, COR, —$SO_2$R or —$SO_2$NHR (R represents hydrogen, alkyl or aryl), or $R^1$ and $R^2$ or $R^1$ and $R^3$ are linked each other to form a 5 or 6-membered ring; and at least one other compound capable of abosorbing light in a portion of ultraviolet region in which the ultraviolet absorber of the formula (I) cannot absorb.

16 Claims, 3 Drawing Sheets

ULTRAVIOLET-ASBORBING POLYMER FILM

FIELD OF THE INVENTION

The present invention relates to an ultraviolet-absorbing polymer film which can be employed for an optical filter or a protective film for a polarizing plate of a liquid crystal display, and especially to an ultraviolet-absorbing polymer film which can be employed for the protective film.

BACKGROUND OF THE INVENTION

An optical filter is generally employed as a sharp cut filter for an optical device for measurement, a filter for color correction of an object (for projected image) conducted in the case of optically recording the object (e.g., in the case of taking a photograph of the object or recording the object on a videotape), or a filter for correction of optical characteristics in a color density correcting device. In more detail, as examples of the optical filters, there are known (1) sharp cut filter, (2) infrared (absorbing) filter, (3) neutral density filter, (4) color correction filter for taking color photography, (5) color correction filter for color print and (6) filter for especial use (e.g., separation filter, masking filter for photomechanical process, visual sensitivity filter).

These filters are generally required to transmit light in the specific wavelength region as thoroughly as possible and cut off light in the region other than the specific region as thoroughly as possible. For example, as a sharp cut filter for ultraviolet (the filter above (1)), various filters which are classified depending on wavelength region of transmitted light, are employed. Such a sharp cut filter for ultraviolet (e.g., trade name: SC-40, available from Fuji Photo Film Co., Ltd.) is required to transmit light in a wavelength region of longer than 400 nm as thoroughly as possible and cut off light in a wavelength region of not longer than 400 nm as thoroughly as possible. Moreover, the filter is also required to show immediately high transmittance to light of the wavelength exceeding 400 nm.

The sharp cut filter for ultraviolet is also useful for a protective film for a polarizing plate of a liquid crystal display which is used in a personal computer, word processor or television receiver. The protective film for polarizing plate is needed to have optically nonorientation property, good adhesion to polarizing plate, evenness of surface, high absorption of ultraviolet, a high transparent, and a little change of dimension depending on variation of temperature and humidity. Further, in the case that the protective film is employed for a liquid crystal display for loading a car, the film is required to have good durability such as excellent chemical stability and good dimensional stability under the conditions of high temperature and high humidity.

A cellulose tricacetate film is widely employed as the protective film, because the cellulose tricacetate film has a high transparent, optically nonorientation property, good adhesion to polarizing plate and a little change of dimension depending on variation of temperature and humidity. However, the cellulose tricacetate film does not show a high absorption of ultraviolet. Therefore, in the case that the cellulose tricacetate film is employed for a protect film for a polarizing plate of a liquid crystal cell, an ultraviolet absorber is generally incorporated into the cellulose acetate film to prevent deterioration of liquid crystal of the cell. Such a protective film is generally attached to both sides of the polarizing plate which is provided on one or both sides of the liquid crystal cell.

The cellulose triacetate film can be obtained, for example, by a solvent casting method comprising the steps of: casting a dope of cellulose triacetate (acetyl value: 60–62%) and plasticizer in a mixed solvent of dichloromethane and methanol on a continuously rotating drum or a moving band conveyor (endless belt), and then vaporizing the solvent of the casted layer. As the dope in the solvent casting method, a dope containing silicon dioxide and a ultraviolet is generally employed in order to improve rublicating property (scratching property) and light resistance (prevention of deterioration by ultraviolet). In more detail, the dope is prepared by the steps of: dispersing silicon dioxide and a ultraviolet absorber in a solvent or a solution of cellulose triacetate in a solvent, and mixing the obtained dispersion with the above dope. When this dope is casted and dried in the above manner, the resultant film shows good rublicating property by formation of evenness (by silicon dioxide) and improved light resistance (by ultraviolet absorber).

In order to improve the light resistance, 2,2'-dihydroxy-4,4'-dimethoxybenzophenone is generally employed as a ultraviolet absorber to be incorporated in the cellulose triacetate film. However, the film containing this absorber is tinged with yellow, and therefore is not satisfactorily suitable for the protect film of polarizing plate. Further, when a dye having relationship of complimental color with yellow is incorporated in the film to eliminate the yellowing, the resultant film shows reduced transparency. Therefore the film cannot maintain transparency required for the protect film. The yellowing is caused by the absorption of visible ray in wavelength near to 400 nm by 2,2'-dihydroxy-4,4'-dimethoxybenzophenone.

Japanese Patent Provisional Publications No. 7(1995)-11056 discloses the specific benzotriazole compound to improve the yellowing. However, light passed through a film containing the compound contains light in wavelength of less than 400 nm in an appreciable amount. Therefore, when a liquid crystal display having the film as a protective film is employed out of doors, liquid crystal of the display or the protective film is easily damaged.

As described previously, the sharp cut filter for ultraviolet (e.g., trade name: SC-40, available from Fuji Photo Film Co., Ltd.) is particularly required to transmit light in a wavelength region of longer than 400 nm as thoroughly as possible and cut off light in a wavelength region of not longer than 400 nm as thoroughly as possible. As ultraviolet absorbers employed in the sharp cut filter, benzophenone compounds, salicylate compounds and benzotriazole compounds are generally employed, which are described in Japanese Patent Provisional Publications No. 5(1993)-265078. Though the transmittance curves of these compounds have a rising of curve in wavelength of 400 nm, the rising is not steep. Hence, use of these absorbers does not give satisfactory prevention of the yellowing and cut-off of ultraviolet to the film. Further, when a large amount of the absorber is so incorporated in a film as to cut off thoroughly an ultraviolet, the resultant film is tinged with yellow because it absorbs light in wavelength of longer than 400 nm. Also, use of the sharp cut filter (the film) in photography does not give an image having sufficiently high sharpness.

SUMMARY OF THE INVENTION

The inventor has studied to obtain an ultraviolet-absorbing polymer film which is not tinged with yellow and capable of transmitting thoroughly light in a wavelength region of longer than 400 nm, particularly to obtain a film capable of transmitting thoroughly light in a wavelength region of longer than 400 nm and absorb thoroughly light in a wavelength region of not longer than 400 nm to cut thoroughly off the light. In more detail, he has first studied to find a compound not only almost absorbing light in an ultraviolet and cutting off almost visible light but also having transmittance curve having steeply rising position (point) on the wavelength of approx. 400 nm. Thus, he has found the compound of the formula (I), which is a known compound as ultraviolet absorber. However, the compound cannot absorb light in a portion of ultraviolet region. Therefore, he has further studied to find other ultraviolet absorber capable of absorbing light in the portion of ultraviolet region in which the compound of the formula (I) cannot absorb, and thus attained to the invention.

It is an object of the present invention to provide an ultraviolet-absorbing polymer film capable of transmitting in high transmittance light in a wavelength region of longer than approx. 400 nm and cut off almost thoroughly light in a wavelength region of not longer than approx. 400 nm.

It is another object of the invention to provide an ultraviolet-absorbing polymer film capable of transmitting almost thoroughly light in a wavelength region of longer than 400 nm and cut off almost thoroughly light in a wavelength region of not longer than 400 nm.

It is an ultraviolet-absorbing further object of the invention to provide a polymer film having high transparency and excellent light resistance.

There is provided by the present invention an ultraviolet-absorbing polymer film which comprises a polymer and ultraviolet absorbers contained therein, said ultraviolet absorbers comprising a compound having the formula (I):

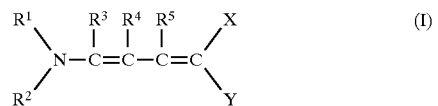

wherein each of $R^1$ and $R^2$ independently represents a hydrogen atom, an alkyl group of 1 to 10 carbon atoms or an alkyl group of 1 to 10 carbon atoms which is substituted with phenyl; each of $R^3$, $R^4$ and $R^5$ independently represents a hydrogen atom, a phenyl group or an alkyl group of 1 to 5 carbon atoms; and each of X and Y independently represents a cyano group, —COOR, —CONHR, —COR, —$SO_2$R or —$SO_2$NHR in which R represents a hydrogen atom, an alkyl group or an aryl group; or $R^1$ and $R^2$ or $R^1$ and $R^3$ are linked each other to form a 5 or 6-membered ring;

and at least one other compound capable of absorbing light in a portion of ultraviolet region in which the compound of the formula (I) cannot absorb.

Preferred embodiments of the polymer film of the invention as follows:

1) The polymer film wherein the polymer is cellulose triacetate.
2) The polymer film wherein said other compound has properties capable of absorbing light in the portion of ultraviolet region (preferably in a wavelength region of not longer than 260 nm) and transmitting visible light.
3) The polymer film wherein other compounds are at least one compound selected from the group consisting benzophenone compounds, salicylate compounds and benzotriazole compounds.
4) The polymer film which contains the ultraviolet absorbers in an amount of 0.1 to 20 weight parts based on 100 weight parts of the polymer.
5) The polymer film wherein a ratio of the compound of the formula (I) and other compound (formula (I):other) is in the range of 99:1 to 20:80 by weight.

6) The polymer film which has transmittance on a wavelength of 400 nm of not less than 60%.
7) The polymer film wherein R of the formula (I) represents hydrogen, alkyl of 1 to 20 carbon atoms, alkyl group of 1 to 20 carbon atoms substituted with aryl of 6 to 14 carbon atoms, aryl of 6 to 14 carbon atoms or aryl of 6 to 14 carbon atoms substituted with alkyl group of 1 to 20 carbon atoms.
7) The polymer film wherein R of the formula (I) represents hydrogen, alkyl of 1 to 20 carbon atoms, alkyl group of 1 to 20 carbon atoms substituted with phenyl, phenyl or phenyl substituted with alkyl group of 1 to 20 carbon atoms.
8) The polymer film wherein X of the formula (I) represents —COOR, and Y of the formula (I) represents —$SO_2$R.
9) The polymer film wherein each of $R^1$ and $R^2$ independently represents an alkyl group of 1 to 3 carbon atoms.
10) The polymer film wherein each of $R^3$, $R^4$ and $R^5$ represent a hydrogen atom.
11) The polymer film wherein the compound of the formula (I) has a transmittance curve having steeply rising position on the specific wavelength (preferably 380–420 nm, especially 390–410 nm) and transmitting light in a portion of ultraviolet region (preferably in a wavelength region of not longer than 260 nm).

The polymer film is advantageously employed for a protective film of a polarizing sheet, the polarizing sheet comprising a polarizing plate and the protective film provided on one side or both sides of the polarizing plate.

Further, the polymer film is advantageously employed for a sharp cut filter for ultraviolet.

The polymer film of the invention is capable of transmitting almost light in a wavelength region of longer than approx. 400 nm and cutting off almost light in a wavelength region of not longer than approx. 400 nm, and further its transmittance curve steeply rises on the specific wavelength (approx. 400 nm). Hence, the polymer film can be suitably employed as a protective film for polarizing plate showing excellent light resistance.

Further, the polymer film can be suitably employed for a sharp cut filter for ultraviolet (e.g., polarizing glasses, UV-cut filter). Further, the polymer film of the invention can be utilized, in combination other optical filter, for a sharp cut filter, a color correction filter for taking color photography, a color correction filter for color print or a filter for especial use (e.g., separation filter, masking filter for photomechanical process, visual sensitivity filter).

DETAILED DESCRIPTION OF THE INVENTION

Figure 1:
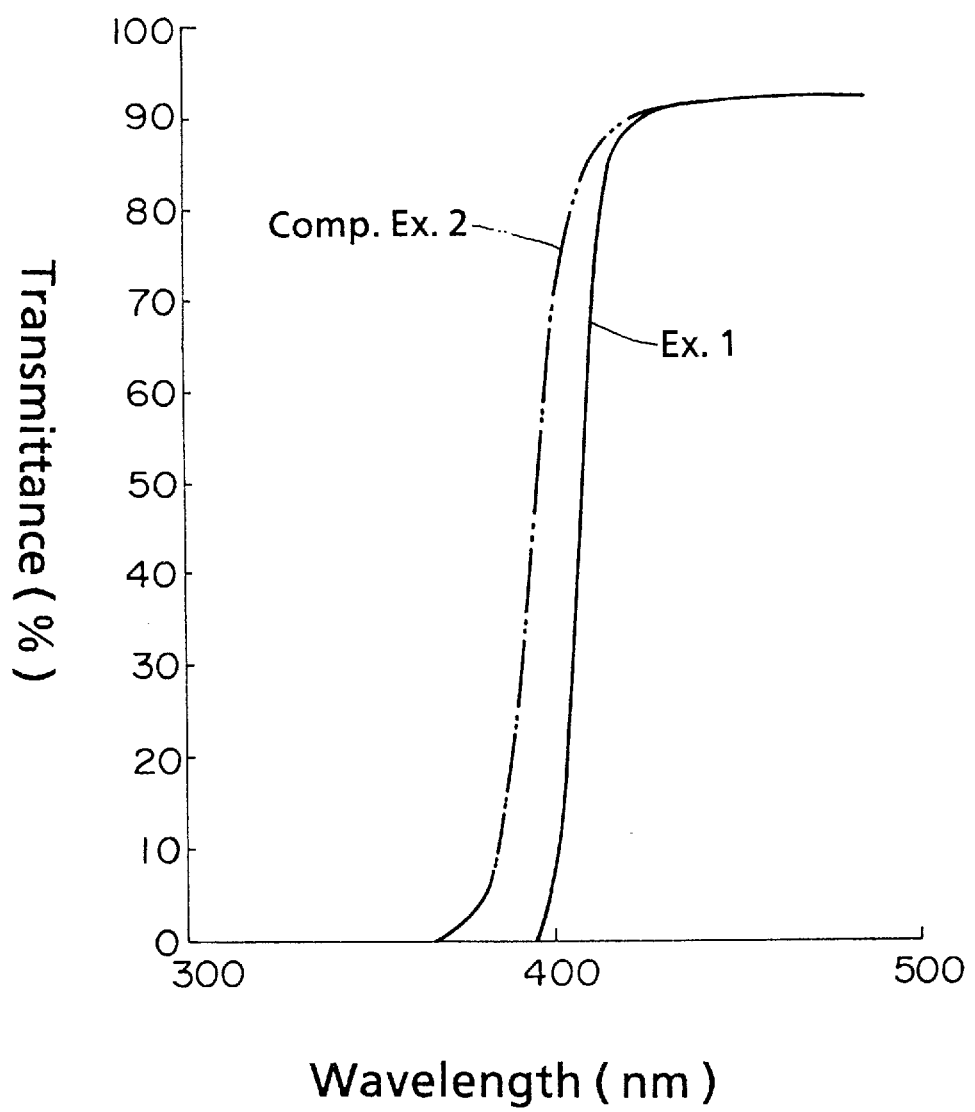
FIG. 1 is a graph showing transmittance curves of light in a wavelength region of 300 to 500 nm of films obtained in Example 1 and Comparison Example 2.

The polymer film of the invention basically comprises a polymer and two ultraviolet absorbers consisting of an ultraviolet absorber of the formula (I) and other ultraviolet absorber capable of absorbing light in a partial ultraviolet region in which the ultraviolet absorber of the formula (I) cannot absorb. The polymer film of the invention can be employed as a protective film for a polarizing plate of liquid crystal display, or an optical filter such as a sharp cut filter (especially for ultraviolet), a color correction filter for taking color photography and a color correction filter for color print.

Examples of polymers employable for the polymer film of the invention include polyesters (e.g., polyethylene terephthalate and polyethylene-2,6-naphthalate); cellulose esters (e.g., cellulose diacetate, cellulose triacetate and cellulose acetate butyrate); polyolefins (e.g., polypropylene and polyethylene); polymers derived from vinyl chloride (e.g., polyvinyl chloride and vinyl chloride/vinyl acetate copolymer); acrylic resins (e.g., polymethyl methacrylate); polycarbonate esters (e.g., polycarbonate); norbornene resins; and water soluble resins (e.g., gelatin).

Examples of polymers especially employable for the optical filter include polyethylene terephthalate, polyethylene-2,6-naphthalate, cellulose triacetate, polypropylene, polyethylene, polycarbonate, polymethyl methacrylate, polymers derived from vinyl chloride and norbornene resins.

Examples of polymers especially employable for the protective film include polyethylene terephthalate, polyethylene-2,6-naphthalate, cellulose triacetate, polycarbonate and norbornene resins.

As cellulose triacetate, the known materials can be employed. The acetyl value of cellulose triacetate preferably is in the range of 50 to 70%, especially in the range of 55 to 65%. The weight average molecular weight of cellulose acetate preferably is in the range of 70,000 to 120,000, especially 80,000 to 100,000. Cellulose acetate may be esterfied using a fatty acid such as propionic acid or butyric acid so long as the acetyl value satisfies the range. Otherwise, cellulose acetate may contain other cellulose ester such as cellulose propionate or cellulose butylate so long as the acetyl value satisfies the range.

A cellulose acetate film generally contains a plasticizer. Examples of the plasticizers include phosphate esters such as triphenyl phosphate, tricresyl phosphate and cresyl diphenyl phosphate; and phthalate esters such as diethyl phthalate, dimethoxyethyl phthalate and dimethyl phthalate. The plasticizer is preferably contained in the film in an amount of not more than 20 weight %, especially of 5 to 15 weight %. Films prepared from polymers other than cellulose triacetate may also contain appropriately the above plasticizer.

The polymer film of the invention contains two kinds of ultraviolet absorbers. As one of the absorbers, the film contains a compound having the following formula (I), of which transmittance curve shows a steep rising on a wavelength of approx. 400 nm (the position of the rising point can be shifted in the range of 10 nm by variation of the adding amount). In more detail, the compound shows steep change of transmittance in a wavelength region in the vicinity of 400 nm.

Formula (I):

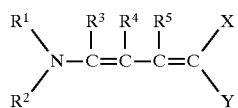

wherein each of $R^1$ and $R^2$ independently represents a hydrogen atom, an alkyl group of 1 to 10 carbon atoms or an alkyl group of 1 to 10 carbon atoms which is substituted with phenyl; each of $R^3$, $R^4$ and $R^5$ independently represents a hydrogen atom, a phenyl group or an alkyl group of 1 to 5 carbon atoms; and each of X and Y independently represents a cyano group, —COOR, —CONHR, COR, —SO$_2$R or —SO$_2$NHR in which R represents hydrogen, alkyl or aryl; or $R^1$ and $R^2$ or $R^1$ and $R^3$ are linked each other to form a 5 or 6-membered ring.

The alkyl group of R preferably is alkyl of 1 to 20 carbon atoms, alkyl of 1 to 20 carbon atoms having a substituent or cycloalkyl (preferably of 5 to 20 carbon atoms). Examples of the substituent include hydroxyl, cyano, nitro, halogen, alkoxy (e.g., methoxy, ethoxy, butoxy or octyloxy), aryloxy (e.g., phenoxy), alkoxycarbonyl (e.g., methoxycarbonyl, ethoxycarbonyl, octyloxycarbonyl or dodecyloxycarbonyl), acyloxy (e.g., propionyloxy, octanoyloxy or benzoyloxy), amino (e.g., dimethylamino, ethylamino or diethylamino), aryl (e.g., phenyl), carboxamide (e.g., acetamide or benzamide), carbamoyl (e.g., ethylcarbamoyl or phenylcarbamoyl), sulfonamide (e.g., methanesulfonamide or benzenesulfonamide), sulfamoyl (e.g., butylsulfamoyl, phenylsulfamoyl or methyloctylsulfamoyl).

The aryl group of R preferably is aryl of 6 to 14 carbon atoms or aryl of 6 to 22 carbon atoms having a substituent. Examples of the substituent include alkyl (e.g., methyl, ethyl, n-propyl, isopropyl, butyl, sec-butyl, tertbutyl, pentyl, tert-pentyl, octyl, decyl, dodecyl, tetradecyl or hexadecyl).

R preferably is a hydrogen atom, an alkyl group of 1 to 20 carbon atoms, an alkyl group of 1 to 20 carbon atoms which is substituted with alkoxy, alkoxycarbonyl or phenyl, a phenyl group, or a phenyl group which is substituted with alkyl (preferably of 1 to 20 carbon atoms) or alkoxy (preferably of 1 to 20 carbon atoms). Especially, R is a hydrogen atom, an alkyl group of 1 to 20 carbon atoms, an alkyl group of 1 to 20 carbon atoms which is substituted with phenyl, a phenyl group, or a phenyl group which is substituted with alkyl (preferably of 1 to 20 carbon atoms).

X of the formula (I) preferably represents —COOR, and Y of the formula (I) represents —SO$_2$R. R of —COOR generally is an alkyl group of 1 to 20 carbon atoms, an alkyl group of 1 to 20 carbon atoms which is substituted with phenyl, a phenyl group, or a phenyl group which is substituted with alkyl of 1 to 20 carbon atoms, preferably an alkyl group of 5 to 10 carbon atoms, more preferably an alkyl group of 6 to 9 carbon atoms and most preferably an alkyl group of 8 carbon atoms. R of —SO$_2$R preferably is a hydrogen atom or an alkyl group of 1 to 3 carbon atoms, especially a hydrogen atom.

In the formula (I), each of $R^1$ and $R^2$ generally is an alkyl group of 1 to 6 carbon atoms or an alkyl group of 1 to 6 carbon atoms which is substituted with phenyl, preferably an alkyl group of 1 to 6 carbon atoms, and especially an alkyl group of 1 to 3 carbon atoms (preferably ethyl or n-propyl, especially ethyl).

Each of $R^3$, $R^4$ and $R^5$ generally is a hydrogen atom, a methyl group or an ethyl group, preferably a hydrogen atom or a methyl group, and especially a hydrogen atom.

Preferred examples of the compounds of the formula (I) are as follows:

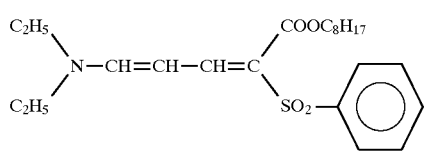

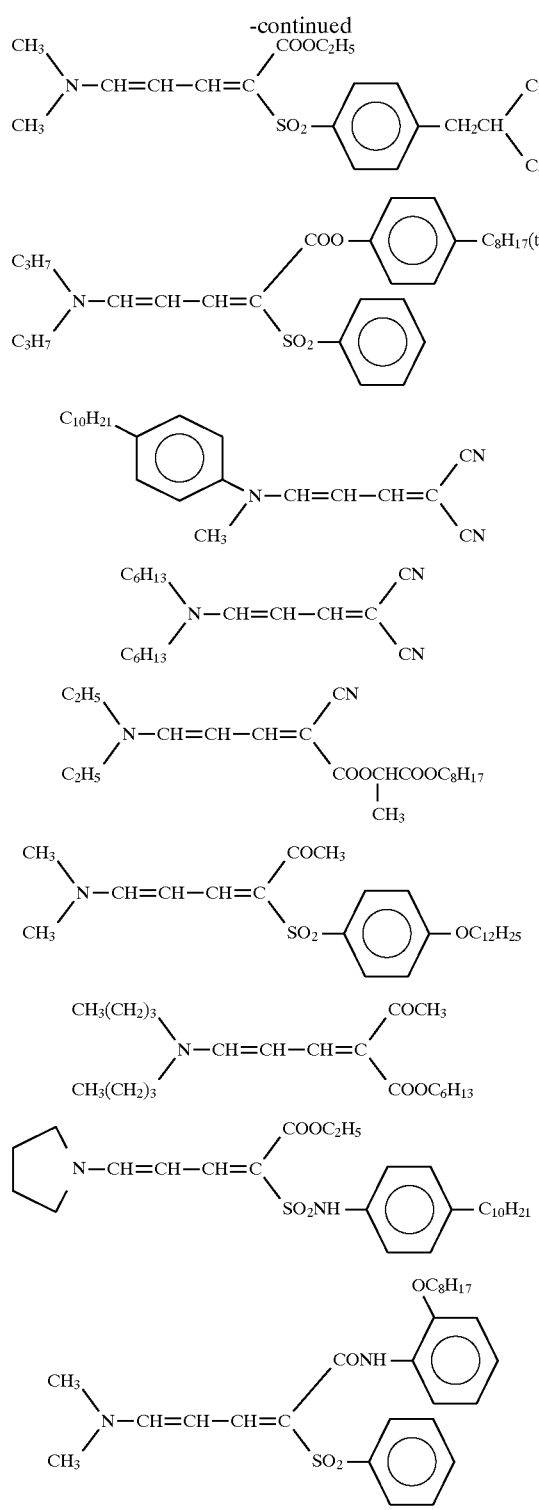

The ultraviolet absorber of the formula (I) shows a transmittance curve having steep rising (steeply rising position) on a wavelength of approx. 400 nm. However, the ultraviolet absorber cannot sufficiently absorb light in a portion of ultraviolet region (i.e., in the region of not longer than 260 nm, generally approx. 260 nm to approx. 360 nm, especially in the region in the vicinity of 300 nm). Therefore, the invention employs at least one other ultraviolet absorber capable of absorbing light in the portion of ultraviolet region in which the ultraviolet absorber of the formula (I) cannot absorb, together with the ultraviolet absorber of the formula (I).

Said at least one other ultraviolet absorber has generally properties capable of absorbing light in the portion of ultraviolet region (generally in a wavelength region of not longer than 260 nm, preferably approx. 260 nm to approx. 360 nm, especially in the region in the vicinity of 300 nm) and transmitting visible light (generally in a wavelength region of 400 to 700 nm).

Examples of said at least one other ultraviolet absorber include benzophenone compounds such as 2,1'-dihydroxy-4,4'-dimethoxybenzophenone, 2-hydroxy-4-methoxybenzophenone and 2-hydroxy-4-n-dodecyloxybenzophenone; salicylate compounds such as 4-t-butylphenylsalicylate; benzotriazole compounds such as 2-(hydroxy-5-t-octylphenyl)benzotriazole, 2-(2'hydroxy-5'-methylphenyl)benzotriazole and 2-(2'-hydroxy3',5'-di-t-butylphenyl)-5-chlorobenzotriazole; and [2,2'thiobis-(4-t-octylphenolate)]n-butylamine nickel(II). Preferred are benzophenone compounds, salicylate compounds and benzotriazole compounds.

Both of the ultraviolet absorber of the formula (I) and other ultraviolet absorber (the other of two ultraviolet absorbers) is generally contained in the polymer in an amount of 0.1 to 20 weight parts based on 100 weight parts of the polymer containing no ultraviolet absorber, and preferably contained in an amount of 0.1 to 10 weight parts, especially in an amount of 0.5 to 5 weight parts.

A ratio of the ultraviolet absorber of the formula (I) and other ultraviolet absorber (the other of two ultraviolet absorbers) generally is in the range of 99:1 to 20:80 by weight (absorber of the formula (I):other absorber), preferably in the range of 95:5 to 40:60, and especially in the range of 90:10 to 40:60.

As mentioned previously, the rising point (wavelength value) in the transmittance curve can be shifted by variation of the adding amount of the ultraviolet absorber. For example, in the case that the compounds I-1 mentioned above is added to cellulose triacetate in an amount of 2 weight parts based on 100 weight parts of cellulose triacetate to form a polymer film of 80 μm thickness, the polymer film has the rising position on a wavelength of 400 nm. Further, the addition of 4 weight parts of the compound gives the rising position on 410 nm, and the addition of 8 weight parts of the compound gives the rising position on 420 nm. Thus, the rising position can be appropriately shifted.

The polymer film containing both the ultraviolet absorber of the formula (I) and other ultraviolet absorber according to the invention preferably shows transmittance on 400 nm of not more than 60%, especially not more than 30%. Further, the polymer film preferably shows transmittance on 370 nm of not more than 3%, especially not more than 1%.

The polymer film may contain particles of an inorganic or organic compound to give lubricating property. Examples of the inorganic compound include silicon dioxide, titanium dioxide, aluminium oxide, zirconium oxide, calcium carbonate, talc, clay, calcined kaolin, calcined calcium silicate, hydrate calcium silicate, aluminium silicate, magnesium silicate and calcium phosphate. Preferred are silicon dioxide, titanium dioxide and zirconium oxide, and especially silicon dioxide. Examples of the organic compound (polymer) include silicone resin, fluororesin and acrylic resin. Preferred is silicone resin.

The average size of the particle is not especially restricted. The size generally is in the range of 0.001 to 1.0 μm, preferably 0.001 to 0.5 μm. The particle is generally incorporated in an amount of 0.005 to 0.5 weight parts in the polymer based on 100 weight parts of the polymer containing no absorber, and preferably in an amount of 0.01 to 0.1 weight parts.

A process for the preparation of the polymer film of the invention is explained below.

The polymer film is preferably prepared by utilizing solvent casting method; i.e., method of casting a solution of polymer in solvent. In more detail, the solvent casting method comprises the steps of: casting the polymer solution fed from a slit of a solution feeding device (die) on a support and drying the casted layer to form a film.

In a large-scale production, the method can be conducted, for example, by the steps of casting a polymer solution (e.g., a dope of cellulose triacetate) on a continuously moving band conveyor (e.g., endless belt) or a continuously rotating drum, and then vaporizing the solvent of the casted layer. In a small-scale production, the method can be conducted, for example, by the steps of casting a polymer solution fed from a slit of a solution feeding device on a fixed support having a regular size such as a metal plate or glass plate by moving the device, and then vaporizing the solvent of the casted layer.

Any support can be employed in the solvent casting method, so long as the support has property that a film formed thereon can be peeled therefrom, Therefore, supports other than the metal and glass plates (e.g., plastic film) are also employable, so long as the supports have the above property. Any die can be employed, so long as it can feed a solution at a uniform rate. Further, as methods for feeding the solution to the die, a method using a pump to feed the solution at a uniform rate can be employed. In a small-scale production, a die capable of holding the solution in an appropriate amount can be utilized.

A polymer employed in the solvent casting method is required to be capable of dissolving in a solvent. Further a film formed of the polymer is generally required to have high transparency and to have a little optical anisotropy because of optical use. Furthermore, the polymer preferably has compatibility with the absorbers. As the polymer employed in the solvent casting method, preferred is cellulose triacetate. However, other polymers can be employed so long as they satisfy the above conditions.

As a method for the formation of polymer film other than the solvent casting method, there can be mentioned the known extrusion molding method comprising the steps of mixing the polymer and the absorbers with melting, and extruding the mixture. The method is generally applied to polymers which cannot utilize the solvent casting method.

Subsequently, the process for the preparation of the optical polymer film of the invention is explained in detail referring to a cellulose triacetate film below.

In a mixing vessel, a solvent, cellulose triacetate and a plasticizer are placed, and cellulose acetate is dissolved by stirring (under heating, if desired under pressing) to prepare a dope. In another mixing vessel, a solvent and two ultraviolet absorbers are placed, and the absorbers are dissolved by stirring. In the case that particles to improve lubricating property are added, the particles are placed in the resultant absorber containing solution and the mixture is dispersed using a dispersing machine to prepare a dispersion. An appropriate amount of the absorber containing solution is fed to the vessel holding the dope, and they are mixed. The mixture (dope) is fed to a casting head appropriately through a filter for dope, and is casted from the casting head on a endless belt of metal (support).

The film casted on the drum is dried during one rotation of the belt to form a film having self-bearing properties, and the dried film is separated from the drum, and then the film is sufficiently dried to be wound. A metal drum can be utilized instead of the endless belt.

The dope and the absorber containing solution can be mixed by the use of a static mixer which is mounted midway of the piping before the casting head, fed to the casting head and casted from the casting head on a metal drum (support).

Any solvent can be employed in the solvent casting method so long as the used polymer (e.g., cellulose triacetate) can be dissolved. The solvent may be single solvent or a combination of plural solvents.

Examples of solvents employed in the solvent casting method include aliphatic hydrocarbons such as pentane, hexane, heptane, octane, isooctane and cyclohexane; aromatic hydrocarbons such as benzene, toluene and xylene; chlorinated hydrocarbons such as chloromethane, dichloromethane, carbon tetrachloride and trichloroethane; alcohols such as methanol, ethanol, isopropyl alcohol and n-butyl alcohol; and esters such as methyl formate, ethyl formate, methyl acetate and ethyl acetate.

In the case of employing cellulose triacetate as the polymer, a mixed solvent of dichloromethane and methanol is generally employed. Other solvents such as isopropyl alcohol and n-butyl alcohol can be employed so long as cellulose triacetate is not deposited (e.g., during the procedure preparing the dope or adding the particles to the dope). A ratio of cellulose triacetate and a solvent in the dope preferably 10:90 to 30:70 by weight (cellulose triacetate:solvent).

In the procedure preparing the dope or the dispersion, various additives such as a dispersing agent, a fluorescent dye, an antiformer, a lubricant, an inhibitor of fade and a preservative can be added to the dope or the dispersion.

The optical polymer film of the invention is effective for cutting off light in the ultraviolet region (ultraviolet radiation) as described previously, and therefore the polymer film can be suitably employed as a protective film for polarizing plate showing excellent light resistance. Further, the polymer film can be employed by bonding directly on a surface of a liquid crystal display.

The polymer film of the invention is capable of transmitting almost light in a wavelength region of longer than approx. 400 nm and cutting off almost light in a wavelength region of not longer than approx. 400 nm, and further its transmittance curve has a steep rising on the specific wavelength of approx. 400 nm. Hence, the polymer film can be suitably employed for a sharp cut filter for ultraviolet (e.g., polarizing glasses, UV-cut filter). Further, the polymer film of the invention can be utilized, in combination other optical filter, for a sharp cut filter, a color correction filter for taking color photography, a color correction filter for color print or a filter for especial use (e.g., separation filter, masking filter for photomechanical process, visual sensitivity filter). In the polymer film of the invention, the specific wavelength of the rising position can be shifted in the range of 10 nm by variation of the adding amount, and the specific wavelength can be changed depending on its use.

EXAMPLE 1

In a mixing vessel for a dope, 100 weight parts of cellulose triacetate (acetyl value: 61%), 12 weight parts of TPP (triphenyl phosphate), 365 weight parts of dichloromethane and 35 weight parts of methanol were placed, and cellulose acetate was dissolved by stirring under heating to prepare a dope.

In another mixing vessel, 15 weight parts of an ultraviolet absorber (compound of formula (I): I-1) and 9 weight parts of an ultraviolet absorber (UV-1) having the following structure, 70 weight parts of dichloromethane and 6 weight parts of methanol were placed, and the two absorbers were dissolved by stirring under heating to prepare a ultraviolet absorber containing solution.

To the dope (512 weight parts) of the mixing vessel for a dope, 10.2 weight parts of the ultraviolet absorber containing solution was added, and they were sufficiently mixed to prepare a mixed solution (dope). The mixed solution was fed to a casting head and was casted from the casting head on an endless belt of metal (support). After the casted film was separated from the belt, the film was dried by passing through a heating zone to prepare a cellulose triacetate film having a thickness of 80 μm (polymer film suitable for protective film for polarizing plate).

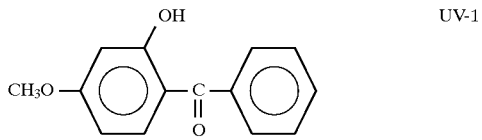

COMPARISON EXAMPLE 1

The procedures of Example 1 were repeated except for employing 24 weight parts of ultraviolet absorber (I-1) instead of both the ultraviolet absorber (I-1) and ultraviolet absorber (UV-1), which were employed for preparing the ultraviolet absorber containing solution, to prepare a cellulose triacetate film.

COMPARISON EXAMPLE 2

The procedures of Example 1 were repeated except for employing both of 10 weight parts of a benzotriazole type ultraviolet absorber (UV-2) having the following structure and 5 weight parts of an ultraviolet absorber (UV-3) having the following structure instead of 15 weight parts of the ultraviolet absorber (I-1), which was employed for preparing the ultraviolet absorber containing solution, to prepare a cellulose triacetate film.

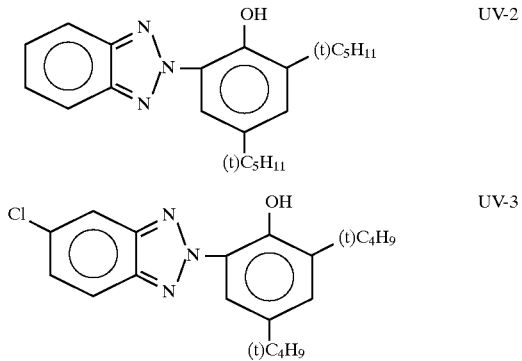

[Evaluation of spectroscopic characteristics]

The obtained cellulose triacetate films (Example 1 and Comparison Examples 1 and 2) were evaluated on the spectroscopic characteristics in the following manner.

The transmittance of each of the films was measured in a wavelength region of 300 to 500 nm using a spectrophotometer (U-3400, available from Hitachi, Ltd.) to obtain a transmittance curve.

Figure 2:
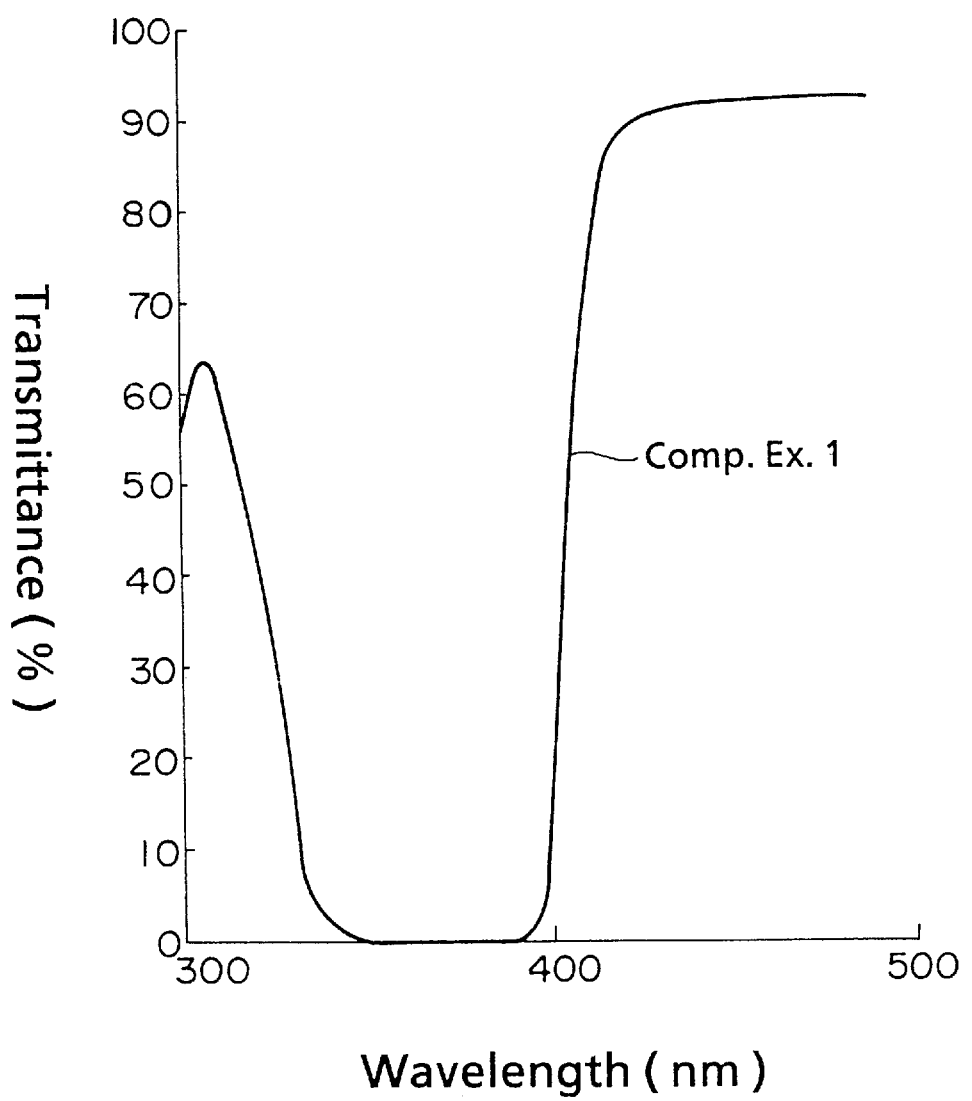
FIG. 2 is a graph showing a transmittance curve of light in a wavelength region of 300 to 500 nm of a film obtained in Comparison Example 1.

The measured results are set forth in FIG. 1 and FIG. 2.

In FIG. 1, transmittance curves (300–500 nm) of the films obtained in Example 1 and Comparison Example 2 are shown. The transmittance curve of the film of Example 1 steeply rises in the vicinity of 395 nm, and shows transmittance of not less than 90% in the vicinity of 420 nm. In contrast, although the transmittance curve of the film of Comparison Example 2 shows transmittance of not less than 90% in the vicinity of 420 nm, the transmittance curve rises in the vicinity of 370 nm which is considerably short wavelength compared with 395 nm. Hence, the film of Comparison Example 2 does not sufficiently cut off ultraviolet radiation, and therefore the film is inferior to the film of Example 1 in light resistance. When the film of Comparison Example 2 is used as a protective film for polarizing plate of liquid crystal display, the film cannot satisfactorily inhibit deterioration of liquid crystal.

The transmittance curve of the film of Comparison Example 1 also steeply rises in the vicinity of 395 nm in the same manner as in Example 1. However, the film shows transmittance of not less than 60% in the vicinity of 310 nm. Hence, the film of Comparison Example 1 does not sufficiently cut off ultraviolet radiation, and therefore the film is inferior to the film of Example 1 in light resistance.

EXAMPLE 2

The procedures of Example 1 were repeated except for changing the amount of ultraviolet absorber (I-1) form 15 weight parts to 13.3 weight parts, changing the amount of the ultraviolet absorber (UV-1) from 9 weight parts to 8 weight parts, and the amount of dichloromethane form 70 weight parts to 72.7 weight parts, to prepare a cellulose triacetate film having a thickness of 90 μm (polymer film suitable for sharp cut filter for ultraviolet).

COMPARISON EXAMPLE 3

The procedures of Example 1 were repeated except for employing 30 weight parts of benzophenone type ultraviolet absorber (UV-4) instead of both the ultraviolet absorber (I-1) and ultraviolet absorber (UV-1), and the amount of dichloromethane from 70 weight parts to 64 weight parts to prepare a cellulose triacetate film having a thickness of 90 μm (polymer film suitable for sharp cut filter for ultraviolet).

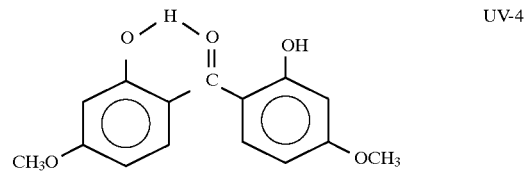

[Evaluation of spectroscopic characteristics]

The obtained cellulose triacetate films (Example 2 and Comparison Example 3) were evaluated on the spectroscopic characteristics in the same manner as above.

Figure 3:
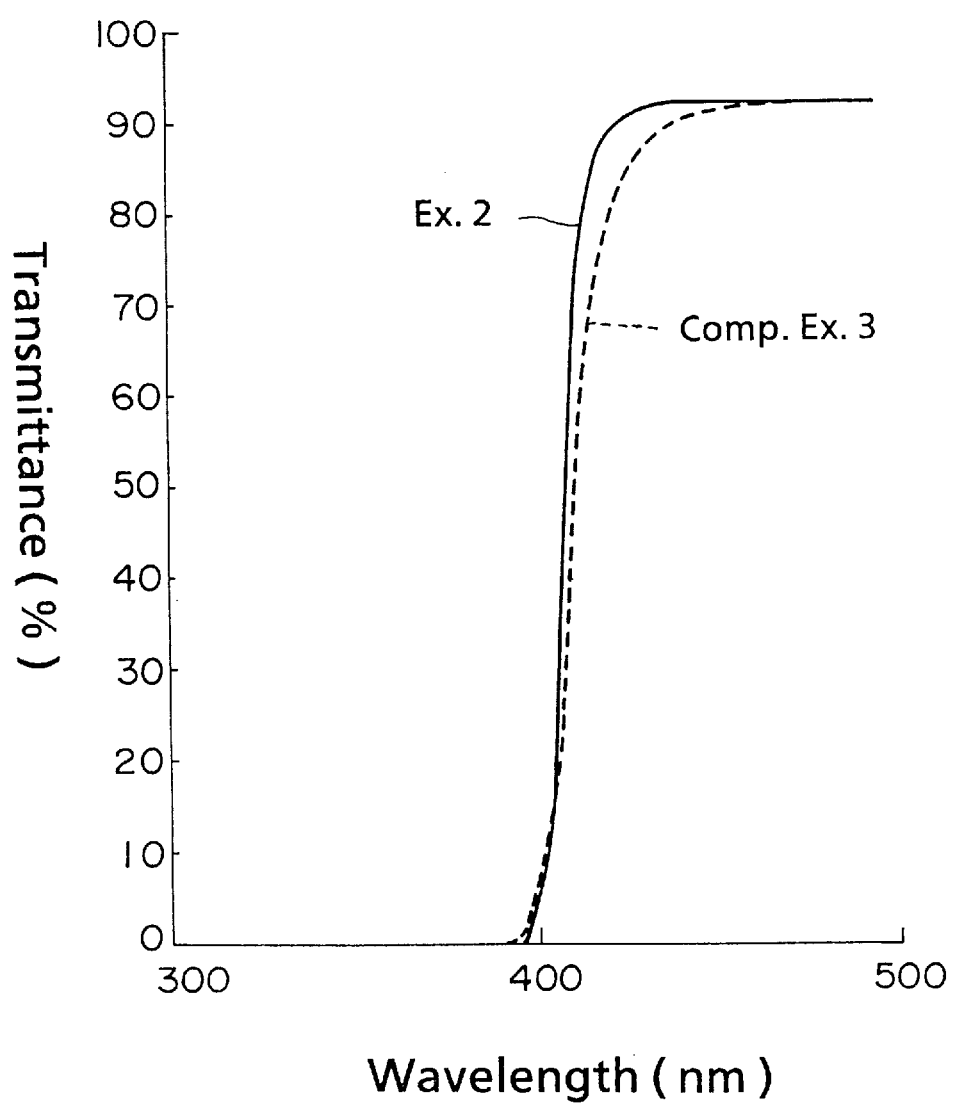
FIG. 3 is a graph showing transmittance curves of light in a wavelength region of 300 to 500 nm of films obtained in Example 2 and Comparison Example 3.

The measured results were set forth in FIG. 3.

In FIG. 3, transmittance curves (300–500 nm) of the films obtained in Example 2 and Comparison Example 3 are shown. The transmittance curve of the film of Example 2 steeply rises in the vicinity of 395 nm, and shows transmittance of not less than 90% in the vicinity of 420 nm. In contrast, although the transmittance curve of the film of Comparison Example 3 rises in the vicinity of 395 nm, the rising is not as steep as in Example 2, which results in transmittance of 80% in the vicinity of 420 nm. Hence, the film of Comparison Example 3 is inferior in characteristics for sharp cut filter (UV) to the film of Example 2.

What is claimed is:

1. An ultraviolet-absorbing polymer film which comprises cellulose triacetate and an ultraviolet absorber contained therein, said ultraviolet absorber comprising a combination of (a) a compound having the formula (I):

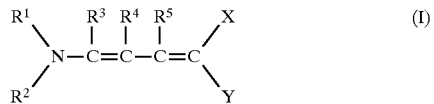

wherein each of $R^1$ and $R^2$ independently represents a hydrogen atom, an alkyl group of 1 to 10 carbon atoms or an alkyl group of 1 to 10 carbon atoms which is substituted with phenyl; each of $R^3$, $R^4$ and $R^5$ independently represents a hydrogen atom, a phenyl group or an alkyl group of 1 to 5 carbon atoms; and each of X and Y independently represents —COOR, —CONHR, —COR, —$SO_2$R or —$SO_2$NHR in which R represents a hydrogen atom, an alkyl group or an aryl group; or $R^1$ and $R^2$ or $R^1$ and $R^3$ are linked with each other to form a 5 or 6-membered ring;

and (b) at least one other compound capable of absorbing light in a portion of ultraviolet region in which the compound of the formula (I) cannot absorb.

2. The polymer film as defined in claim 1, wherein said other compound has properties capable of absorbing light in a wavelength region of not longer than 260 nm and transmitting visible light.

3. The polymer film as defined in claim 1, wherein said other compound is at least one compound selected from the group consisting benzophenone compounds, salicylate compounds and benzotriazole compounds.

4. The polymer film as defined in claim 1, which contains the ultraviolet absorbers in an amount of 0.1 to 20 weight parts based on 100 weight parts of the polymer.

5. The polymer film as defined in claim 1, wherein a ratio of the compound of the formula (I) and other compound is in the range of 99:1 to 20:80 by weight.

6. The polymer film as defined in claim 1, wherein X represents —COOR and Y represents —$SO_2$R wherein
R represents a hydrogen atom, an alkyl group or an aryl group.

7. The polymer film as defined in claim 1, which shows transmittance at a wavelength of 400 nm of not more than 60%.

8. The polymer film as defined in claim 1, which shows transmittance at a wavelength of 400 nm of not more than 30%.

9. An ultraviolet-absorbing polymer film which comprises a polymer and an ultraviolet absorber contained therein, said ultraviolet absorber comprising a combination of a compound having the formula (I):

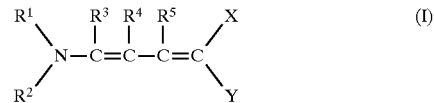

wherein each of $R^1$ and $R^2$ independently represents a hydrogen atom, an alkyl group of 1 to 10 carbon atoms or an alkyl group of 1 to 10 carbon atoms which is substituted with phenyl; each of $R^3$, $R^4$ and $R^5$ independently represents a hydrogen atom, a phenyl group or an alkyl group of 1 to 5 carbon atoms; and each of X and Y independently represents —COOR, —CONHR, —COR, —$SO_2$R or —$SO_2$NHR in which R represents a hydrogen atom, an alkyl group or an aryl group; or $R^1$ and $R^2$ or $R^1$ and $R^3$ are linked with each other to form a 5 or 6-membered ring;

and at least one other compound capable of absorbing light in a portion of ultraviolet region in which the compound of the formula (I) cannot absorb.

10. The polymer film as defined in claim 9, wherein said other compound has properties capable of absorbing light in a wavelength region of not longer than 260 nm and transmitting visible light.

11. The polymer film as defined in claim 9, wherein said other compound is at least one compound selected from the group consisting of benzophenone compounds, salicylate compounds and benzotriazole compounds.

12. The polymer film as defined in claim 9, which contains the ultraviolet absorbers in an amount of 0.1 to 20 weight parts based on 100 weight parts of the polymer.

13. The polymer film as defined in claim 9, wherein a ratio of the compound of the formula (I) and other compound is in the range of 99:1 to 20:80 by weight.

14. The polymer film as defined in claim 9, wherein X represents —COOR and Y represents —$SO_2$R wherein R represents a hydrogen atom, an alkyl group, or an aryl group.

15. The polymer film as defined in claim 9, which shows transmittance at a wavelength of 400 nm of not more than 60%.

16. The polymer film as defined in claim 9, which shows transmittance at a wavelength of 400 nm of not more than 30%.

* * * * *